Oct. 1, 1957 D. V. SINNINGER 2,808,508

RECEIVER FOR A. M. SPEECH CHANNEL HAVING MEANS TO ELIMINATE EFFECTS OF SUPERIMPOSED FREQUENCY SHIFT KEYING

Filed Dec. 31, 1953 2 Sheets-Sheet 1

INVENTOR.
Dwight V. Sinninger
BY
Thiess, Olson, Mecklenburger, von Holst, & Coltman
Attys.

Oct. 1, 1957 D. V. SINNINGER 2,808,508

RECEIVER FOR A. M. SPEECH CHANNEL HAVING MEANS TO ELIMINATE EFFECTS OF SUPERIMPOSED FREQUENCY SHIFT KEYING

Filed Dec. 31, 1953 2 Sheets-Sheet 2

INVENTOR.
Dwight V. Sinninger.
BY.
Thiess, Olson, Mecklenburger, von Holst, & Coltman.
Attys.

2,808,508

RECEIVER FOR A. M. SPEECH CHANNEL HAVING MEANS TO ELIMINATE EFFECTS OF SUPERIMPOSED FREQUENCY SHIFT KEYING

Dwight V. Sinninger, Oak Park, Ill., assignor, by mesne assignments, to Hupp Corporation, Cleveland, Ohio, a corporation of Virginia Application December 31, 1953, Serial No. 401,487

12 Claims. (Cl. 250—20)

This invention relates to radio receiving apparatus, and more particularly to improved apparatus for receiving a radio signal on which intelligence is impressed by varying the amplitude of said signal, the frequency of said signal, or both of these characteristics.

It is a principal object of this invention to provide an improved radio receiver capable of reception of two independent but coincident intelligences without interference therebetween.

Several systems have heretofore been proposed by which a common carrier may be utilized to transmit and receive an amplitude modulated (AM) intelligence and coincidently carry a teletype message by a frequency shift (FS) of the carrier. In simple systems of transmission and reception, this combination of functions is found completely compatible, and little or no interference between the two modes of intelligence transmission is produced. In such simple systems a conventional receiver is employed having appropriate stages for radio frequency amplification, frequency conversion, intermediate frequency amplification, detection and audio amplification. In addition thereto, the signal generated by the intermediate frequency, or I. F., amplifiers is applied to a limiter and frequency discriminator which detects a shift in the carrier frequency and generates a signal in accordance with such shift whereby the output may be utilized to operate a teletypewriter. The audio output is substantially unaffected by the frequency shifts as all of the stages are broadly tuned to accommodate sufficient band width to pass the carrier and sidebands over a range in excess of 200 cycles, the maximum frequency shift generally employed in teletype transmission which is accompanying amplitude modulation signals.

However, to receive an amplitude modulated signal with optimum fidelity and minimum distortion and interference it is desirable to employ a receiving apparatus which is capable of altering the signal as received before passing the signal to the final detecting or demodulating portion of the receiver. To avoid distortion in the detected signal it is necessary that the carrier have, at all times, an amplitude greater than that of the sidebands which represent the intelligence being conveyed. To insure this mode of operation, receivers are provided which isolate the carrier from the sidebands, customarily by the use of filters, amplify the carrier to a predetermined level, and reinsert the amplified carrier into the basic signal having the sidebands whereby the distortion which would otherwise result from overmodulation is eliminated.

A second common source of distortion in received radio signals is that which results from relative phase shift between the two sidebands of a given signal. To avoid the distortion which would be produced by such a phase shift, receivers are provided which remove one of the sidebands from the incoming signal and utilize a single sideband in the detector. A single sideband carries all of the intelligence which is transmitted from a given transmitter. In removing one of the sidebands from an incoming signal, diminution of the carrier will generally result because of the inherent characteristics of the band pass filters employed. To compensate for this attenuation and to gain other desired actions it is customary to provide an amplified or exalted carrier in single sideband reception also.

When utilizing these improved modes of reception of amplitude modulated signals it has been found that any rapid changes in the frequency of the incoming wave will produce a tremolo or other objectionable interference in the resulting audio signal as a result of the phase shift of the exalted carrier which is not present in the original carrier and sidebands. The phase shift in the exalted carrier results primarily from the passage of said carrier through a narrow band pass filter circuit.

Therefore it is a further object of this invention to provide improved radio receiving apparatus which is adapted to receive a signal carrying intelligences thereon produced both by amplitude and frequency variation wherein each variable is free of interference or distortion which might be produced by the other.

It is another object of this invention to provide improved radio receiving apparatus adapted for reception of a carrier having both an amplitude and frequency varying characteristic in which no tremolo is produced in the audio output after demodulation of the AM signal as a result of a frequency shift of the incoming carrier.

It is still another object of this invention to provide radio receiving apparatus adapted for single sideband reception and frequency shift teletype reception wherein the amplitude modulated signal will not evidence any distortion or interference from the frequency shift.

It is still another object of this invention to provide improved radio receiving apparatus utilizing sideband selection and exalted carrier means for improving the reception of amplitude modulated signals, said receiver also being adapted to receive frequency shift intelligence without producing distortion in the two intelligence channels.

It is a further object of this invention to provide improved radio receiving apparatus utilizing an exalted carrier circuit wherein the phase of the exalted carrier is automatically adjusted to maintain substantial phasic agreement between the incoming signal and the exalted carrier whereby distortion and interference are minimized.

It is still another object of this invention to provide a closed cycle control system in which the phase of an exalted carrier in a radio receiver is automatically maintained in substantial agreement with the phase of an incoming signal.

It is a further and important object of this invention to provide an automatic frequency control system which may be utilized in a receiver adapted for reception of signals having amplitude modulation, frequency shift intelligence or both impressed thereon.

It is still another object of this invention to provide an improved system for high fidelity audio reception and coincident frequency shift teletype reception which may be readily installed in existing equipment, which is not subject to failure, and which does not require extensive maintenance or adjustment.

It is a further object of this invention to provide an improved system for rendering a diversity receiver adapted for single sideband and exalted carrier reception compatible with frequency shift teletype reception.

Further and additional objects of this invention will become manifest from a consideration of this description, the accompanying drawings, and the appended claims.

In one form of this invention a radio receiver is provided which is adapted for operation in multiple modes whereby various known sources of interference and distortion may be eliminated. The receiver further provides for the reception of teletype intelligence which is transmitted by a narrow frequency shift of the amplitude modulated signal. A signal is received from the transmitting station which contains audio intelligence, amplitude modulated onto a carrier in the customary fashion. In addition thereto teletype intelligence has been imposed upon the signal by shifting both the carrier and the sidebands of said signal to a new predetermined frequency within a limited range over which the normal AM receiving apparatus will function without distortion. Four independent modes of operation are provided in this receiver, namely a normal mode, in which the incoming signal is merely amplified and detected; an exalted carrier mode in which the carrier is isolated from the sidebands and independently amplified, after which it is reinserted into the original signal including sidebands, thus avoiding any danger of distortion from overmodulation; an upper sideband exalted carrier mode in which the carrier is segregated and independently amplified and the lower sideband is eliminated, whereby interference which might otherwise result from overmodulation or sideband phase shift is eliminated; and lowerside band exalted carrier mode reception in which the upper sideband is eliminated and the carrier independently amplified for the same purpose as that just described. As the carrier is isolated from the associated sidebands by passage through a sharply tuned band pass filter, the shifting of the carrier in transmitting teletype intelligence causes a substantial phase shift at the output of the carrier filter. This phase shift will produce objectionable thumping or tremolo when the carrier is recombined with the sidebands. To eliminate this interference the carrier is passed from the band pass filter to a dynamic phase shifting circuit which automatically adjusts the phase to bear a fixed relationship to that of the original signal with sidebands. The dynamic phase shifting circuit is energized from an automatic phase controlling discriminator which continuously compares the phase of the incoming signal with that of the exalted carrier and generates a voltage which corresponds directly to the magnitude of phase deviation.

The output of the carrier filter is also utilized to energize a quadrature phase shifting circuit, the output of which is applied to a balanced discriminator which receives a second voltage corresponding to the carrier before passage through the band pass filter. This discriminator produces a voltage correspending to the phase shift of the carrier in passing through the carrier filter which in turn bears a predetermined relationship to the frequency shift of the incoming signal. The output of this discriminator serves two purposes: It is applied to a variable reactance circuit after passage through a time constant network, the output of said variable reactance circuit determining the frequency which is maintained in the intermediate frequency stages of the receiver prior to the circuits herein described. The discriminator output is also applied through a low pass filter and clipper, clamp, and D. C. restorer to a D. C. amplifier which directly energizes a teletype printer to reproduce the teletype intelligence transmitted by the frequency shift of the incoming signal.

For a more complete understanding of this invention reference will now be made to the accompanying drawings, wherein.

Figure 1:
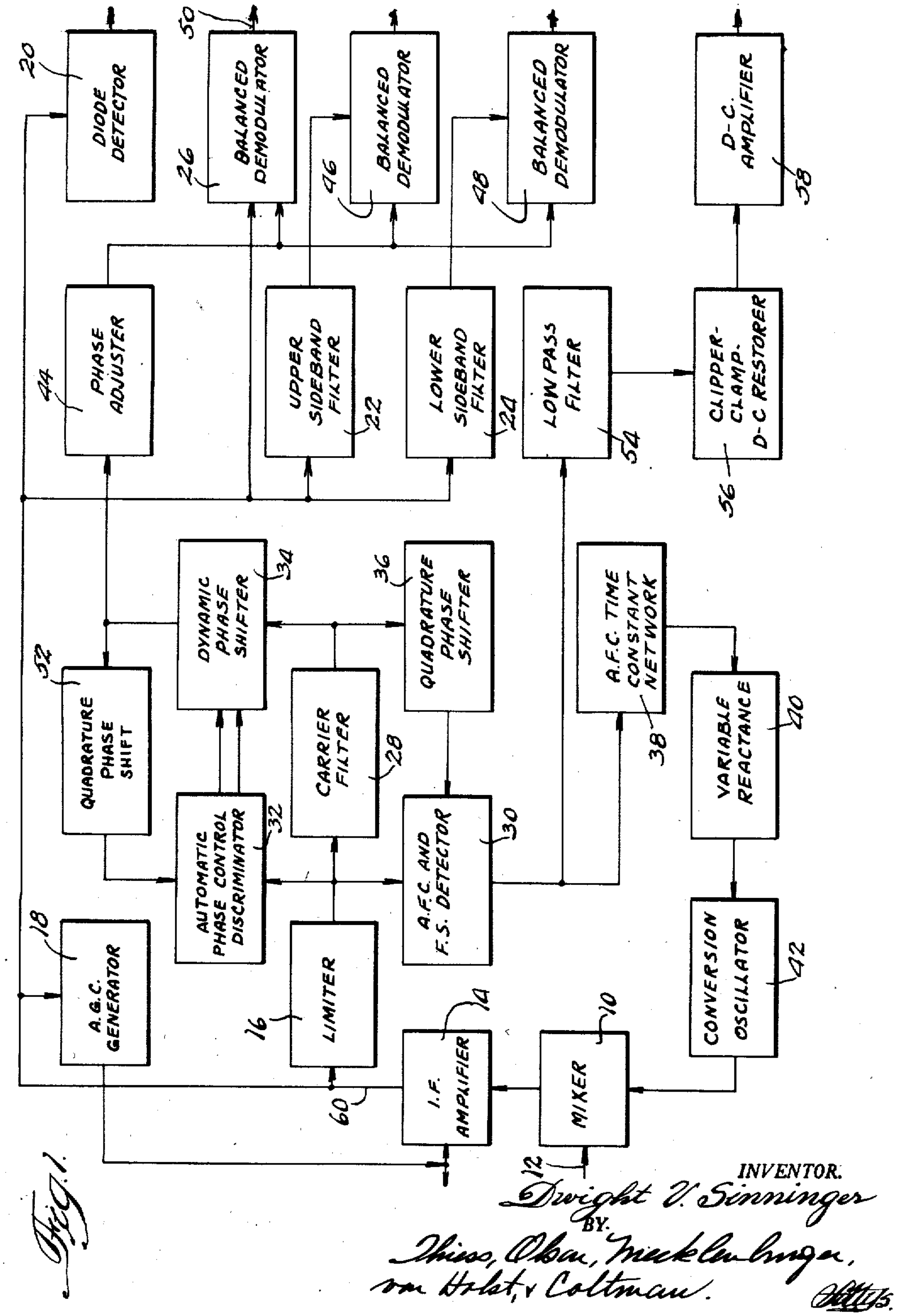
Fig. 1 is a block diagram of certain circuits of a radio receiver which illustrates one embodiment of this invention.

Referring now to the drawings, and more particularly to Fig. 1, the sideband selector, carrier exaltation and detector portions of a four mode superheterodyne receiver are illustrated. The portions of the receiver illustrated in Fig. 1 may be one of two or more identical systems employed in conjunction with identical receivers as utilized in a diversity receiving system wherein the various outputs of the individual receivers are automatically combined in a control unit to produce the optimum quality in the resulting audio signal with minimum fading and distortion. This automatic control in combining the signals may readily be accomplished by generating an automatic gain control D. C. voltage which is fed back to all of the independent receivers but the magnitude of which bears a fixed relationship to the sum of all of the signal strengths, or to the stronger signal. However, for the purposes of this invention a single detector circuit will be described as each of the multiple receivers functions in an identical manner.

In Fig. 1 the received signal is applied to the mixer 10 from previous stages of amplification as indicated by arrow 12. The signal is therein heterodyned with a signal from conversion oscillator 42 in the well-understood manner to produce an intermediate frequency which in one particular embodiment of this invention is 137 kilocycles. This intermediate frequency is applied to the I. F. amplifier 14, where it is amplified to a predetermined voltage level. The output of I. F. amplifier 14 is applied to limiter 16, automatic gain control voltage generator 18, diode detector 20, upper sideband filter 22, lower sideband filter 24, and exalted carrier balanced demodulator 26. The output of I. F. amplifier 14 represents the normal signal produced by a customary superheterodyne receiver, and is applied to diode detector 20 for normal mode reception, utilized primarily for tuning and adjustment. The output of automatic gain control (AGC) voltage generator 18 is a D. C. signal which is combined with other AGC signals from other receivers of the system and fed back to the I. F. amplifier 14 and the various previous stages of the receivers to produce a substantially constant level output from the receivers in the well-known manner.

The limiter 16 may be of any well-known type but is preferably an overloaded amplifier which will produce a substantially constant output irrespective of the magnitude of the signal applied at its input. Thus the amplitude modulated intelligence present in the incoming signal is substantially removed by limiter 16 but any frequency shift intelligence will be passed therethrough. The output of limiter 16 is applied to carrier filter 28, automatic frequency control and frequency shift detector 30, and automatic phase control discriminator 32. The output of the carrier filter 28, which is sharply tuned, will be a substantially pure carrier frequency having no interference, noise, or sidebands associated therewith. The output of filter 28 is applied to dynamic phase shifter 34 and quadrature phase shifter 36. The output of quadrature phase shifter 36 is applied to AFC and frequency shift (FS) detector 30. Detector 30 is a balanced demodulator serving as a discriminator with the quadrature voltage supplied from the carrier filter 28, as will be explained in detail with respect to Fig. 2, whereby small frequency shifts in the incoming signal will produce a large output signal which may be utilized to generate both an automatic frequency control signal and a signal for operation of a teletype printer. The output of discriminator 30 is applied to an AFC time constant network 38 which may be one of a plurality of well-known circuits, the simplest of which is a parallel condenser and series resistor whereby the full potential will not appear at the output of network 38 for a predetermined time, depending upon the time constant of the network, following the application of a potential at the input thereof. The purpose of this network is to apply the output voltage from the discriminator to the variable reactance circuit 40 only for frequency changes which persist over a relatively long period of time. Thus by proper selection of the components of network 38, the variable reactance 40 will not be affected by the reception of individual teletype bands but will adjust the steady-state frequency of the output signal from mixer 10 which is applied to the I. F. amplifier 14 by altering the frequency of the conversion oscillator 42 in accordance with the sustained averaged output of discriminator 30.

The output of discriminator 30 is also applied to low pass filter 54, which eliminates the carrier and any spurious noise or other interference and passes only the D. C. impulses representing teletype bands. The output of filter 54 is applied to clipper, clamp, and D. C. restorer 56, wherein the signal is amplified and its D. C. level adjusted to produce an output comprising a series of timed D. C. impulses or bands corresponding to the teletype intelligence received from the transmitter. The output of the D. C. restorer is applied to D. C. amplifier 58, which in turn energizes any conventional type of teletypewriter.

The isolated carrier available at the output of filter 28 is applied to dynamic phase shifter 34, wherein the signal is amplified and its phase adjusted so that the output bears a predetermined phasic relationship to the signal applied from the I. F. amplifier 14 to the sideband filters 22 and 24 and the balanced demodulator 26. This reconditioned carrier is applied to a manually adjustable phase shifter 44, the output of which is applied to balanced demodulator 26, upper sideband balanced demodulator 46, and lower sideband balanced demodulator 48. The reconditioned carrier is utilized along with the incoming signal in demodulator 26, which may be any one of several well-known circuits such as a product demodulator, to produce an audio output indicated by arrow 50 which may be amplified by customary audio means for utilization as desired, generally for rebroadcast. The reconditioned carrier is applied to the sideband demodulators 46 and 48 where it is compared with the output of sideband filters 22 and 24 to produce an audio signal at the outputs of said demodulators in the same manner as in the exalted carrier demodulator 26.

The output of dynamic phase shifter 34 provides the reconditioned carrier for subsequent demodulation as described but is also applied to a quadrature phase shifting circuit 52, the output of which is applied to the automatic phase control discriminator 32. Discriminator 32 compares the instantaneous phase of the isolated carrier with that of the output of limiter 16 and produces D. C. error voltages which are applied to the dynamic phase shifter 34 to alter the phase of the isolated carrier in a manner to be described with respect to Fig. 2.

Figures 2, 3:
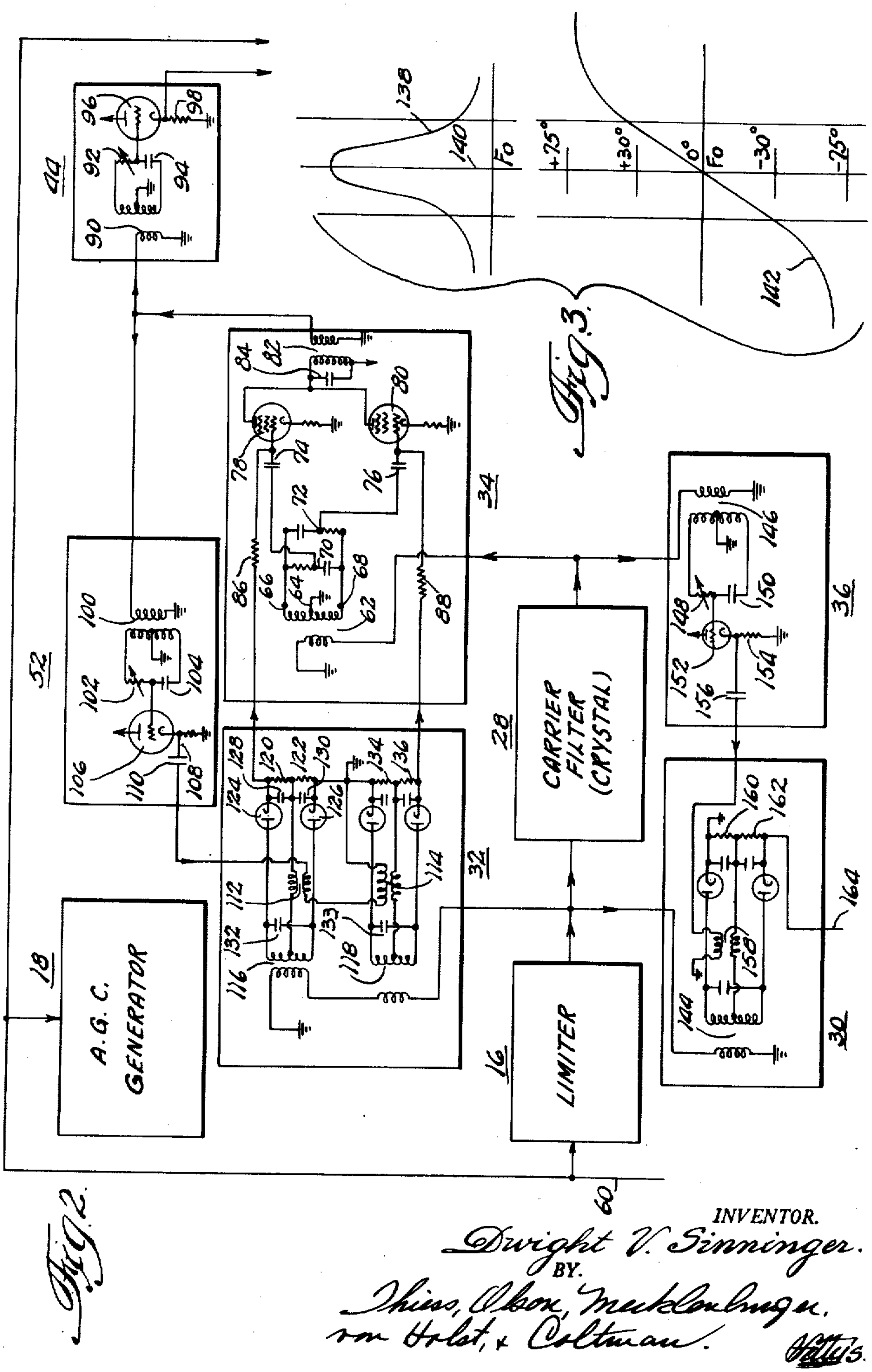
Fig. 2 is a circuit diagram illustrating the contents of certain of the blocks illustrated in Fig. 1.
Fig. 3 is a graphical illustration of the phase and magnitude of the output of the carrier band pass filter as compared to the input thereto.

The elements of the more important blocks of Fig. 1 are shown in detail in Fig. 2. Therein the incoming signal is applied to the limiter 16 from the I. F. amplifier through conductor 60. As described above, the limiter substantially removes the amplitude modulation from the incoming signal, after which the signal is applied to the phase controlling discriminator 32, carrier filter 28, and AFC and frequency shift detector 30. The output of carrier filter 28 is applied to the primary winding of a balanced transformer 62 in the dynamic phase shifter 34. The secondary winding of transformer 62 has a center tap 64 which is connected to ground and terminals 66 and 68 which are energized by the primary to produce equal voltages in 180° phase relation. The voltage appearing between terminals 66 and 68 of the transformer 62 is applied to two networks 70 and 72, each comprising a resistance and capacitance in series, said networks being connected in parallel with the elements inverted. A conductor extends from the center of each of the networks 70 and 72 and is capacitively coupled through respective coupling condensers 74 and 76 to the control grids of appropriately connected pentodes 78 and 80. The networks 70 and 72 are so selected and oriented that the voltage applied to the grid of pentode 78 will normally lag the applied voltage to the network by 60° while the voltage applied to the control grid of pentode 80 will lead the voltage applied to the network by 60°. The plate circuits of pentodes 78 and 80 are connected in parallel to a common output comprising the primary of an output transformer 82 and a condenser 84 in parallel therewith. As the pentodes are energized by signals which are normally 120° out of phase and their plate circuits connected in parallel, the signal appearing across the secondary of transformer 82 will be a vector resultant of the two independent pentode outputs and will have a phase under normal conditions intermediate the two output signals of approximately 180° with respect to the voltage initially applied to the networks 70 and 72 after undergoing full phase reversals in the pentode tubes. A. D. C. bias voltage may be applied to the control grid of pentode 78 from the phase control discriminator 32 through resistor 86. In a like manner, the phase control discriminator 32 may provide a D. C. bias voltage through resistor 88 to the control grid of pentode 80. If a negative bias voltage is applied to either but not both of these pentodes the conduction therethrough will be diminished, as is believed well understood, which will produce an effective phase shift in the output voltage appearing across transformer 82.

The output of transformer 82 is applied to the primary of a balanced transformer 90 of the manual phase adjuster 44. The secondary of transformer 90 has a center tap which is connected to ground and a pair of terminals, one of which is connected to a variable resistor 92 and the other of which is connected to condenser 94. A common connection between resistor 92 and condenser 94 is also connected to the control grid of tube 96, the cathode output of which is applied to the balanced demodulators 26, 46, and 48 of Fig. 1. The tube 96 has a cathode resistor 98 and constitutes a cathode follower whereby the circuit exhibits great stability, current amplifying properties, and improved matching characteristics. The adjustment of resistor 92 will determine the phase of the signal applied to the demodulators and may be critically adjusted to remove any steady or static errors in phase.

As described previously the output of the manual phase adjuster 44, which is a phase corrected exalted carrier signal, is applied to each of the balanced demodulators 26, 46, and 48. The basic signal is applied directly to demodulator 26 from the I. F. amplifier 14 and is passed through upper sideband filter 22 to demodulator 46 and through lower sideband filter 24 to demodulator 48. The output from each of the demodulators will be an audio signal corresponding to the AM intelligence, and by a manually selective arrangement the undistorted audio output of one of the demodulators will be utilized.

The output of transformer 82 is also applied to the primary of a transformer 100 of quadrature phase shifting circuit 52. The secondary of transformer 100 has a grounded center tap and a network comprising adjustable resistor 102 and condenser 104 serially connected across its terminals. The resistor 102 is adjusted whereby the signal applied to the control grid of cathode follower 106 will bear a 90° phase relationship to the applied voltage. The output of cathode follower 106 is taken across cathode resistor 108 and applied through coupling condenser 110 to the serially connected transformers 112 and 114 of a pair of associated balanced demodulators in the phase control discriminator 32.

The output of limiter 16 is also applied to the balanced demodulators through center tapped transformers 116 and 118. The balanced demodulators are connected in a fashion whereby the center taps of transformers 116 and 118 are connected to the secondaries of transformers 112 and 114 respectively, the other windings of which are connected to the common terminals of cathode resistors 120 and 122 and cathode resistors 134 and 136 of two pairs of diode rectifiers 124, 126, and 125, 127. A condenser 128 is connected in parallel with the cathode resistor 120 to sustain a D. C. voltage thereacross, and a similar filter condenser 130 is provided in parallel with cathode resistor 122. A condenser 132 is provided in parallel with the secondary of center tapped transformer 116 and is selected to resonate at substantially the carrier frequency and a condenser 133 is connected in parallel with the secondary of transformer 118 for the same purpose.

Though the manner in which a single balanced demodulator functions is believed clear, a general description of the operation follows. If the voltage applied to transformer 112 bears precisely a 90° phase relationship to the voltage applied to transformer 116, the voltages appearing across resistors 120 and 122 will be of equal and opposite magnitude, and consequently the net voltage at the cathode of diode 124 with respect to ground will be zero. If, however, there is a phase shift produced in either the incoming signal or the isolated carrier signal which is not produced in the other signal, the voltage applied to transformer 112 will no longer bear a 90° phase relationship with respect to the voltage applied to transformer 116. In that event the voltage appearing across resistor 120 or 122 will exceed the voltage appearing across the other of said resistors by a magnitude corresponding to the phase shift. This is believed manifest in that a phase shift in the voltage applied to transformer 112 will cause the signal applied thereto to add to the voltage in one-half of the secondary of transformer 116, while the same phase shift in the voltage applied to the transformer 112 will produce a vector subtraction with respect to the voltage in the other half of the transformer 116.

The second balanced demodulator, comprising the other half of the dual phase control discriminator 32 of this invention, operates in a manner identical with that just described, whereby the voltages appearing across resistors 134 and 136 will be equal and opposite when the phase of the voltage applied to transformer 114 is in quadrature with the phase of the voltage applied to transformer 118. If, however, the phase of the exalted carrier changes with respect to that of the incoming signal, the voltages applied to the two halves of the balanced demodulator will change, producing a D. C. signal across the serially connected resistors 134 and 136, and for a given phase change this signal will be equal to the magnitude of the signal appearing across resistors 120 and 122 but of opposite polarity. These equal and opposite potentials are applied respectively to the control grid of the pentodes 78 and 80 in the dynamic phase shifting circuit 34 to produce a bias on one tube to effect greater conduction and on the other to effect decreased conduction to produce a phase shift as above described in the output of the circuit 34 which tends to bring said output into phasic agreement with the output of limiter 16. Thus the dynamic phase shifting circuit 34, quadrature phase shifting circuit 52, and dynamic phase control discriminator 32 comprise a closed cycle control wherein the discriminator compares the phase of the input to the filter 28 with the output of phase shifter 52 and generates an error signal as determined by that comparison. The error signal applied to the dynamic phase shifting circuit 34 will reduce any phase discrepancies between the two signals toward zero.

A typical response curve for a band pass filter such as carrier filter 28 is illustrated by trace 138 of Fig. 3. The curve is symmetrical about a center axis 140 which represents the carrier frequency $F_0$ which is passed through the filter substantially unattenuated and on either side of which rapid and severe attenuation occurs. The lower curve 142, representing the phase shift produced in the carrier filter 28, clearly illustrates the need for the phase correcting circuits herein described when a system is employed utilizing both amplitude modulation and frequency shift modulation.

The output of limiter 16 is also applied to AFC and frequency shift detector 30 as described with respect to Fig. 1. Detector 30 is a balanced demodulator in which the output of limiter 16 is applied to the primary winding of a center tapped transformer 144. The output of carrier filter 28 is applied to center tapped transformer 146 of quadrature phase shifting circuit 36 which is identical to the quadrature phase shifting circuit 52 above described. A network connected seriatim across the center tapped secondary of transformer 146 comprises a resistor 148 and a condenser 150 having substantially equal impedance, whereby the voltage applied to the grid of cathode follower 152 will bear a 90° phase relationship to the input voltage. The output of this circuit is taken across cathode resistor 154 and applied through coupling condenser 156 to transformer 158 of the balanced demodulator 30. The secondary of transformer 158 is connected between the center tap of the transformer 144 and the common connection of cathode resistors 160 and 162. This balanced demodualtor operates in a manner identical to the first half of the phase control discriminator 32 above described in detail and will produce a D. C. output voltage at conductor 164 which corresponds in magnitude and sense to the phasic relationship of the voltages applied to transformers 144 and 158. Thus a frequency shift of the incoming signal will produce a phase shift in carrier filter 28 which consequently produces a phase shift in the voltage applied to transformer 158, and a D. C. output at conductor 164. Because of the sharp tuning characteristic of carrier filter 28 the phase shift produced for small frequency shifts will be substantial and thus produces a large D. C. output from discriminator 30. This D. C. output, as is believed clear from the description of Fig. 1, is utilized both for automatic frequency control and teletypewriter operation. The signal is applied through AFC time constant network 38 to variable reactance 40, where, as an averaged D. C. potential, it determines the frequency of conversion oscillator 42, which in turn adjusts the steady-state intermediate frequency to a predetermined value substantially corresponding to the center frequency $F_0$ of the carrier filter 28. The signal is also applied through low pass filter 54, clipper, clamp, and D. C. restorer 56, and D. C. amplifier 58 to any conventional teletype printing equipment. The low pass filter functions to eliminate noise and other undesirable signals from the teletype signals, while the clipper removes the peaks from the incoming impulses producing a substantially square wave shape. The clamp establishes a known zero datum for the square wave signal and the D. C. restorer establishes this zero datum at any desired level, customarily with the maximum negative excursions corresponding to zero voltage. Thus when applied to a printer, the printer is actuated only by the positive impulses which it receives. Various circuitry for accomplishing these functions is well known in the art.

Generally the frequency shift which may be tolerated in normal mode reception of amplitude modulated signals without noticeable tremolo or thumping in the received audio is within a range of 10–200 cycles. It has been found that when utilizing single sideband reception and an exalted carrier, frequency shifts of the order of 20 cycles produce objectionable distortion and interference in the output audio. This is not a result of the frequency change, as both carrier and sidebands are altered in frequency shift teletype transmission, but interference results instead from the phase difference between the sidebands and the isolated carrier which has been conditioned by passage through a sharply tuned filter and amplifier. By this invention the customary difficulties exhibited by the superior exalted carrier type of receiver in receiving a signal having both amplitude modulation and frequency shift intelligence are completely overcome. This is accomplished not by eliminating the phase shift of the isolated carrier but by producing a compensating phase shift through the closed cycle control which comprises the automatic phase control discriminator 32 and dynamic phase shifter 34.

While one particular embodiment has herein been described utilizing amplitude modulation and frequency shift teletype transmission, it is believed manifest that many embodiments and modifications will become obvious to one skilled in the art. For example, while in this embodiment upper and lower sideband filters are employed to isolate a particular sideband for use in a particular mode of reception, the same result may be accomplished by supplementing filter selectors with wide band audio phase shifting or by using the latter technique exclusively. Furthermore, while the AFC time constant network circuit in this embodiment is stated to comprise a simple resistance capacitance network, other large time constant techniques may be employed, including the utilization of the Miller effect in a vacuum tube for capacitance multiplication.

While a particular embodiment of the invention has been shown, it will be understood, of course, that the invention is not limited thereto since many modifications may be made, and it is, therefore, contemplated by the appended claims to cover any such modifications as fall within the true spirit and scope of the invention.

The invention having thus been described, what is claimed and desired to be secured by Letters Patent is:

1. In apparatus for receiving radio signals having a carrier and associated sidebands, means for separating such carrier from such sidebands, means for altering such carrier in a predetermined manner, means for continuously adjusting the phase of such altered carrier in accordance with the phasic relationship between the carrier portion of said signals and the altered carrier to bear a predetermined phasic relationship to such sidebands, and means for recombining such altered carrier and such sidebands.

2. In apparatus for receiving radio signals having a carrier and sidebands, means for separating such carrier from such sidebands, means for amplifying such carrier to a predetermined level, means for continuously adjusting the phase of such amplified carrier in accordance with the phasic relationship between the carrier portion of said signals and the altered carrier to bear a predetermined phasic relationship to such sidebands, and means for recombining such amplified carrier and such sidebands.

3. In apparatus for receiving radio signals having a carrier and associated sidebands, means for separating such carrier from such sidebands, means for altering such carrier in a predetermined manner, closed cycle control means for adjusting the phase of such altered carrier in accordance with the phasic relationship between the carrier portion of said signals and the altered carrier to bear a predetermined phasic relationship to such sidebands, and means for recombining such adjusted and altered carrier and such sidebands.

4. In apparatus for receiving radio signals having a carrier and associated sidebands, narrow band filter means for separating such carrier from such sidebands, means for amplifying said carrier to a predetermined level, dynamic phase adjusting means for adjusting the phase of such separated carrier, and means for comparing the phasic relationship of said carrier at the input to said filter and at the output of said dynamic phase adjusting means to generate a control signal corresponding to said relationship, said signal being applied to said control phase adjusting means to alter the phase of the output thereof to correspond to the phase of the input to said filter.

5. In apparatus for receiving radio signals having a carrier and associated sidebands for conveying intelligence as a function of both the amplitude and frequency of the signals, amplitude limiting means energized from said signals, narrow band filter means energized from said limiting means to separate such carrier from such sidebands, dynamic phase adjusting means for determining the phase of the separated carrier relative to the carrier portions of said signals, and means for comparing the phasic relationship of said carrier at the input to said filter and at the output of said phase adjusting means to generate a control signal corresponding to said relationship, said control signal being applied to said phase adjusting means to alter the phase of the output thereof to correspond to the phase of the input to said filter.

6. In apparatus for receiving radio signals having a carrier and associated sidebands for conveying intelligence as a function of both the amplitude and frequency of such signals, amplitude limiting means energized from such signals, narrow band filter means energized from said limiting means to separate such carrier from such sidebands, dynamic phase adjusting means for determining the phase of the separated carrier relative to the carrier portions of said signals, means for comparing the phasic relationship of said carrier at the input to said filter and at the output of said phase adjusting means to generate a control signal corresponding to said relationship, said control signal being applied to said phase adjusting means to alter the phase of the output thereof to correspond to the phase of the input to said filter, and means to recombine said adjusted carrier with the original radio signal.

7. In apparatus for receiving radio signals having a carrier and associated upper and lower sidebands for conveying intelligence as a function of both the amplitude and frequency of such signal, narrow band filter means energized by said radio signal to separate the carrier therefrom, dynamic phase adjusting means for determining the phase of the separated carrier relative to the carrier portions of said signals, means for comparing the phasic relationship of said carrier at the input to said filter and at the output of said phase adjusting means to generate a control signal corresponding to said relationship, said control signal being applied to said phase adjusting means to alter the phase of the output thereof to bear a predetermined phasic relationship to the input to said filter, means to recombine said adjusted carrier with the original radio signal, and detector means energized from the input to said filter and the output therefrom to generate a direct current voltage corresponding to the phase relationship thereof, said voltage indicating the inteligence imposed on said radio signal as a function of the frequency thereof.

8. In apparatus for receiving radio signals having a carrier and associated upper and lower sidebands for conveying intelligence as a function of both the amplitude and frequency of such signal, narrow band filter means energized by said radio signal to separate the carrier therefrom, dynamic phase adjusting means for determining the phase of the separated carrier relative to the carrier portions of said signals, means for comparing the phasic relationship of said carrier at the input to said filter and at the output of said phase adjusting means to generate a control signal corresponding to said relationship, said control signal being applied to said phase adjusting means to alter the phase of the output thereof to bear a predetermined phasic relationship to the input of to said filter, means to recombine said adjusted carrier with the original radio signal, quadrature phase shifting means energized from the output of said filter means, discriminator means energized from the input signal to said filter means and the output from said quadrature phase shifter whereby frequency shifts of the incoming signal produce a corresponding direct current voltage in said discriminator, and time constant means energized from said discriminator means, the output of said time constant means corresponding to frequency changes of such radio signal of substantially longer time duration than the intelligence conveying frequency variations.

9. In apparatus for receiving radio signals having a carrier and associated upper and lower sidebands for conveying intelligence as a function of both the amplitude and frequency of such signal, narrow band filter means energized by said radio signal to separate the carrier therefrom, dynamic phase adjusting means for determining the phase of the separated carrier, means for comparing the phasic relationship of said carrier at the input to said filter and at the output of said phase adjusting means to generate a control signal corresponding to said relationship, said control signal being applied to said phase adjusting means to alter the phase of the output thereof to bear a predetermined phasic relationship to the input to said filter, means to recombine said adjusted carrier with the original radio signal, single sideband selecting means, means for recombining the adjusted carrier and the selected sideband, and detector means energized from the input to said filter and the output therefrom to generate a direct current voltage corresponding to the phase relationship thereof, said voltage indicating the intelligence imposed on said radio signal as a function of the frequency thereof.

10. In apparatus for receiving radio signals having a carrier and associated upper and lower sidebands for conveying intelligence as a function of both the amplitude and frequency of such signal, narrow band filter means energized by said radio signal to separate the carrier therefrom, dynamic phase adjusting means for determining the phase of the separated carrier, means for comparing the phasic relationship of said carrier at the input to said filter and at the output of said phase adjusting means to generate a control signal corresponding to said relationship, said control signal being applied to said phase adjusting means to alter the phase of the output thereof to bear a predetermined phasic relationship to the input to said filter, means to recombine said adjusted carrier with the original radio signals, upper sideband selecting means, means for recombining the adjusted carrier signal and the selected upper sideband, lower sideband selecting means, means for combining the adjusted carrier signal and the selected lower sideband, and detector means energized from the input to said filter and the output therefrom to generate a direct current voltage corresponding to the phase relationship, said voltage indicating the intelligence imposed on said radio signal as a function of the frequency thereof.

11. In apparatus for operating on modulated periodic voltage signals comprising a carrier and associated side bands, sensing means comprising a narrow band, filter energized from said signals to isolate said carrier, and two balanced demodulators each energized with said signals and said isolated carrier and having means for generating a direct current voltage having a magnitude and polarity corresponding to the phase of the periodic voltage relative to said carrier, the outputs of said balanced demodulators being serially connected to produce equal and opposite direct current voltage outputs for a given change in the magnitude and frequency of such periodic voltage signal.

12. In apparatus for operating on modulated periodic voltage signals comprising a carrier and associated side bands, sensing means comprising a narrow band filter energized from said signals to isolate said carrier, two balanced demodulators each energized with said signals and said isolated carrier and having means for generating a direct current voltage having a magnitude and polarity corresponding to the phase of the periodic voltage relative to said carrier, the outputs of said balanced demodulators being serially connected to produce equal and opposite direct current voltage outputs for a given change in magnitude and frequency of such periodic voltage signal, and means energized from the output of said balanced demodulators to control the phase of the output of said narrow band filter.

References Cited in the file of this patent

UNITED STATES PATENTS

| | | |
|---|---|---|
| 2,041,855 | Ohl | May 26, 1936 |
| 2,193,801 | Byrne | Mar. 19, 1940 |
| 2,266,517 | Rust et al. | Dec. 16, 1941 |
| 2,494,323 | Weber | Jan. 10, 1950 |
| 2,512,530 | O'Brien et al. | June 20, 1950 |
| 2,516,009 | Mack et al. | July 18, 1950 |
| 2,551,348 | Sunstein | May 1, 1951 |
| 2,575,047 | Crosby | Nov. 13, 1951 |
| 2,611,825 | Harris | Sept. 23, 1952 |
| 2,619,547 | Ross | Nov. 25, 1952 |
| 2,623,169 | Gardere | Dec. 23, 1952 |

UNITED STATES PATENT OFFICE

CERTIFICATE OF CORRECTION

Patent No. 2,808,508 October 1, 1957

Dwight V. Sinninger

It is hereby certified that error appears in the above numbered patent requiring correction and that the said Letters Patent should read as corrected below.

In the grant, line 3, address of assignee, for "Detroit, Michigan" read --Cleveland, Ohio--; column 5, lines 1, 9 and 13, for "bands", each occurrence, read --bauds--; column 8, line 17, for "demodualtor" read --demodulator--; column 10, line 68, for "substanitally" read --substantially--; column 12, line 2, after "band" strike out the comma.

Signed and sealed this 31st day of December 1957.

(SEAL)
Attest:
KARL H. AXLINE

Attesting Officer

ROBERT C. WATSON
Commissioner of Patents